United States Patent
Bouhelal et al.

(10) Patent No.: US 7,517,942 B1
(45) Date of Patent: Apr. 14, 2009

(54) METHOD TO MAKE REVERSIBLY CROSS-LINKED ISOTACTIC POLYPROPYLENE

(76) Inventors: Said Bouhelal, 1240 Orleans St., Beaumont, TX (US) 77701; Kenneth W. Lewis, 1240 Orleans St., Beaumont, TX (US) 77701

( * ) Notice: Subject to any disclaimer, the term of this patent is extended or adjusted under 35 U.S.C. 154(b) by 231 days.

(21) Appl. No.: 11/487,902

(22) Filed: Aug. 28, 2006

Related U.S. Application Data

(63) Continuation-in-part of application No. 11/192,890, filed on Jul. 29, 2005, now Pat. No. 7,241,844, which is a continuation-in-part of application No. 10/473,351, filed as application No. PCT/DZ02/00001 on Apr. 22, 2002, now Pat. No. 6,987,149.

(51) Int. Cl.
*C08F 110/06* (2006.01)
*C08C 19/20* (2006.01)

(52) U.S. Cl. ............... 526/351; 526/232; 526/234; 525/345; 525/354; 525/343; 525/348

(58) Field of Classification Search ............ 525/345, 525/354, 343, 348; 526/351, 232, 234
See application file for complete search history.

(56) References Cited

U.S. PATENT DOCUMENTS 3,806,558 A * 4/1974 Fischer .................. 525/198

* cited by examiner

*Primary Examiner*—Ling-Siu Choi
(74) *Attorney, Agent, or Firm*—Buskop Law Group PC; Wendy Buskop

(57) ABSTRACT

A method for preparing reversibly cross-linked isotactic polypropylene having a degree of crystallinity substantially identical to a degree of crystallinity of a starting polypropylene by mixing in the presence of heat, a polymer of isotactic polypropylene homopolymer; isotactic polypropylene copolymer; mixtures of isotactic polypropylene homopolymer and copolymer with an elastomer, an organic peroxide, and an accelerator, forming macro-radicals; the simultaneously coupling the macro-radicals with a sulfur obtaining an optimum cross-linking degree and a product made by the method.

10 Claims, 6 Drawing Sheets ined States Patent US 7,517,942 B1

METHOD TO MAKE REVERSIBLY CROSS-LINKED ISOTACTIC POLYPROPYLENE

CROSS REFERENCE TO RELATED APPLICATIONS

The present application is a Continuation-in-Part to U.S. patent application Ser. No. 11/192,890, filed on Jul. 29, 2005, now U.S. Pat. No. 7,241,844 which is a Continuation-in-Part to U.S. patent application Ser. No. 10/473,351, filed on Sep. 30, 2003, (now U.S. Pat. No. 6,987,149, issued on Jan. 17, 2006) which is the national phase application claiming priority to PCT/DZ02/00001 filed on Apr. 22, 2002.

FIELD

The present embodiments relate to a method for cross-linking polypropylene to produce a reversibly cross-linked isotactic polypropylene.

BACKGROUND

Recent developments in the art of polymerization have enabled the production of solid, amorphous polypropylene and co-polymers of ethylene and propylene that have many of the physical characteristics of rubber and, in fact, can be used as an improved replacement for rubber in many applications. These amorphous polymers and co-polymers are thermoplastic and soluble in many organic solvents. Like rubber, these polymers and co-polymers have to be cross-linked, i.e. vulcanized, in order to render the polymers and co-polymers useful for many of the intended uses.

Almost all of the plastic resin sold in today's market is in the form of pellets. Plastic resins are sold in the form of pellets to improve transportation, handling, safety and end-user material processability characteristics. Reactor granular resin is thus melted and extruded and made to flow through dies before being cut into pellets. The extrusion process serves as a step for the addition of performance additives for the required stability and material properties. The size, shape, and uniformity of the pellets are important and measurements of these pellet characteristics are standard quality assurance/quality control (QA/QC) tests to be met during production. The pelletizing step is important from an operational standpoint. Any upset or malfunction of the pelletizer can result in process shutdown and halt manufacturing with serious financial consequences, especially for large extrusion lines. The pelletizing step becomes an important component of the production line of any polyolefin production facility. The pelletizing step is not to be taken lightly in cases where the polymer renders difficult to cut.

Generally, isotactic polypropylene has been considered a non-cross-linkable polymer. This has been due to the fact that the beta-scission degradation process predominates over the cross linking mechanism.

A need exists for a method that allows the preparation of reversibly cross-linked isotactic polypropylene.

The embodiments address these needs.

SUMMARY

A method for preparing reversibly cross-linked isotactic polypropylene having a degree of crystallinity substantially identical to a degree of crystallinity of a starting polypropylene by mixing in the presence of heat (1) a polymer of (a) isotactic polypropylene homopolymer; (b) isotactic polypropylene copolymer; (c) mixtures of isotactic polypropylene homopolymer and copolymer; with (2) an elastomer; (3) an organic peroxide; and (4) an accelerator, forming macro-radicals; the simultaneously coupling the macro-radicals with a sulfur obtaining an optimum cross-linking degree and a product made by the method.

BRIEF DESCRIPTION OF THE DRAWINGS

The detailed description will be better understood in conjunction with the accompanying drawings as follows.

Figure 1:
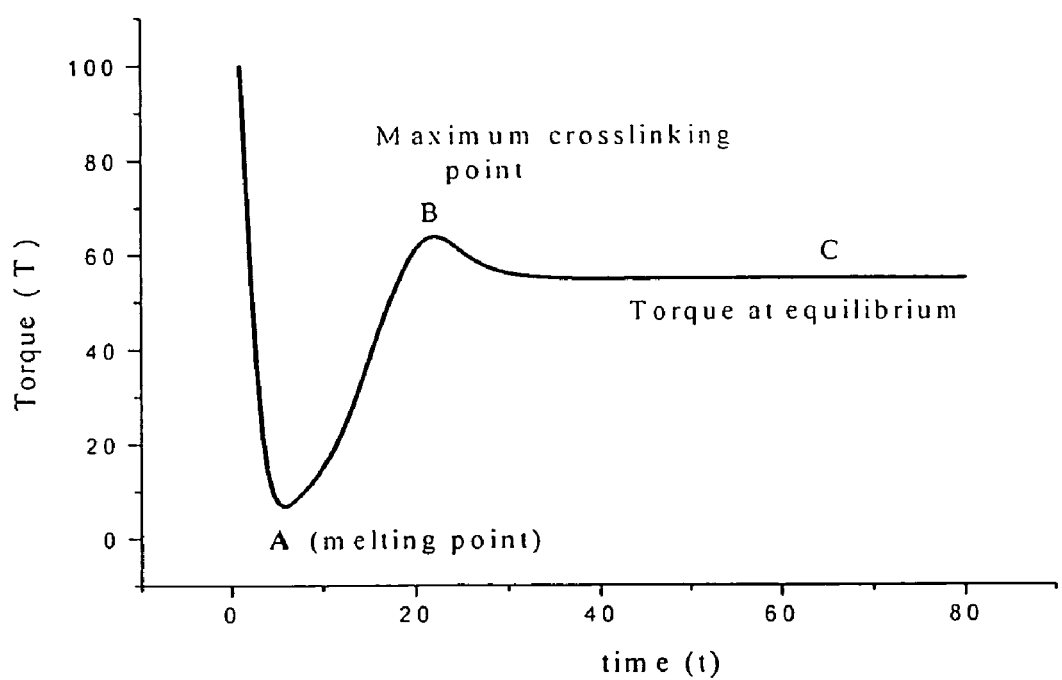
FIG. 1 depicts the torque-time evolution for a cross-linked polyolefin material made by the method.

The present embodiments are detailed below with reference to the listed Figures.

DETAILED DESCRIPTION OF THE EMBODIMENTS

Before explaining the present embodiments in detail, it is to be understood that the embodiments are not limited to the particular descriptions and that it can be practiced or carried out in various ways.

The embodiments relate to a method with multiple variations that cross-links blends of polypropylene and low or high density polyethylene, copolymers of isotactic polypropylene or their blends with various elastomers, such as urethane, or synthetic rubber, or a similar elastomer.

The new method developed for the reversible cross-linking of iPP gives rise to a promising material with improved impact strength, comparable to that shown by conventional elastomers.

The cross-inking process originates a transition from brittle to ductile behavior in the modified iPP.

The crystallinity and the micromechanical properties of the cross-linking iPP are slightly lower than those of unmodified material. The microhardness decrease is attributed to the combined effect of a crystallinity decrease, the occurrence of smaller crystals in the modified iPP, and the appearance of a low fraction (25%-29%) of PE crystals.

In addition the polymers to be cross-linked can be from a variety of sources, blended together and cross-linked in this process. The usable types of polypropylene contemplated herein include recycled polypropylene, freshly prepared polypropylene, polyethylene, restored polyethylene, polypropylene, or combinations thereof.

The principle of the cross-linking mechanism is to create macro-radicals and cause them to act immediately with sulfur before the reaction termination occurs. The cross-linking process takes place by a hemolytic chemical reaction. The initial reaction is originated by the peroxide decomposition, which gives rise to the formation of macro-radicals with a very short lifetime. The sulfur atoms linked the chains in a coupling reaction through the formation of a tri-dimensional, heat resistant network.

The interchain bridges can be a sulfur atom $S_1$, a polysulfide $—(S)_x—$, or a cyclic S-compound.

Accelerators increase the sulfur activation rate. In this way, the macro-radicals formation and their coupling reaction with the sulfur takes place simultaneously, thus obtaining an optimum cross-linking degree for each formulation. The potassium persulfate increases the macro-radicals lifetime making it possible to cross-link more components faster than conventional polymerization processes.

EXAMPLES 1-6

An Isotactic polypropylene (iPP) Sabic-Vestolen 9000-67404 supplied by Chemische Werke Huls, Germany was blended with dicumyl peroxide (DCP) with 96% activity. The peroxide usable in this example was from Norax. Sulfur was supplied by Wuxi Huasbeng Chemical Additives Factory of China. Potassium persulfate was supplied by Inochem, of Belgium. Three accelerators were mixed together to form the desired accelerator, "Super accelerator 500" (tetramethyl thiuram monosulfide, TMTM), "Super accelerator 501 (tetramethyl thiuram disulfide TMTD) and "Quick accelerator 200" (dibenzothiazole disulfide MBTS). The accelerators were from Rhone-Poulenc, of France.

In this example, the cross-linking agent consisted of peroxide, sulfur and a blend of the accelerators noted above.

To prepare this Example, the sulfur concentration was equal to that of the peroxide. The amount of sulfur and peroxide was 0.2 wt % or 0.4 wt % based on the total formation. The accelerator blend was ¼ of the sulfur and peroxide concentration.

The six formulations are on Table 1 below:

TABLE 1

Sample compositions

| Sample | Polymer | Peroxide content % | Sulfur content % | Accelerator content % |
|---|---|---|---|---|
| iPP | iPP | — | — | — |
| 1 | iPP | 0.2 | 0.2 | 0.05 (TMTD) |
| 2 | iPP | 0.4 | 0.4 | 0.1 (TMTD) |
| 3 | iPP | 0.2 | 0.2 | 0.05 (TMTM) |
| 4 | iPP | 0.4 | 0.4 | 0.1 (TMTM) |
| 5 | iPP | 0.2 | 0.2 | 0.05 (MBTS) |
| 6 | iPP | 0.4 | 0.4 | 0.1 (MBTS) |

The method entails the iPP, the cross-linking agent and the potassium persulfate being mixed while in a solid state, using a small quantity of vegetable oil. The oil additive was used to improve the dispersion of the potassium persulfate within the granules of the iPP.

Next the blend was inserted into a single screw laboratory extruder, a Prolabo 1989 single screw extruder with the following characteristics: L/D=20; screw diameter=25 mm; screw speed=60 turns/min.

The residence time of the blend in the extruder was about 3 minutes. The temperature profile used for the three stages was: feed zone=155 degrees Celsius; compression zone=180 degrees Celsius; homogenization zone=200 degrees Celsius. The extrusion cycle was repeated twice in order to achieve a homogeneous blend of reversible cross-linked polypropylene.

Using a Brabender-type plastogragh, the processability of the iPP blends were evaluated by measuring the torque (torque=moment of force) required to mix the molten components in a heated chamber at 200 degrees Celsius at a rotor speed of 30 rpm. The torque-time evolution was firstly measured for the neat peroxide, then measured for each coupling agent—peroxide/accelerator, and finally measured for every cross-linking agent, namely the combined peroxide/sulfur/accelerator combination.

FIG. 1 shows a typical curve illustrating the different steps of the torque-time evolution for this exemplary cross-linked polyolefin material. In this figure, the depicted characteristic points include: (a) starting point of the melt; (b) maximum cross-linking point; and (c) equilibrium point.

At the beginning, the polymer melts and the torque decreases to a minimum value $T_A$. As the cross-linking begins, the torque increases to a maximum value $T_B$. After that, a small decrease of torque is observed, reaching a final stable plateau at point C, usually higher than A. The logarithm of $(T_t-T_A)$ is plotted as a function of time, $T_t$ signifying the torque value at the time (t). When the path of this curve is nearly linear, the cross-linking reaction is of $1^{st}$ order and comprises the main reaction.

The impact strength test was carried out in a device equipped with a control of absorption energy. Specimens were prepared by compression molding. Notched (¹/₁₀ deep) specimens were submitted to the Izod strength testing. The specimen thickness and width were 3 millimeters and 9 millimeters, respectively. Resiliencies $a_k$ (J/m²) and energies of absorption (J) were determined using a hammer of 7 Joules. Measurements were carried out at room temperature according to the ASTM D 180 norm.

The melt flow index (MFI) was measured by allowing a molten polymer to flow under fixed working conditions (load and temperature), through a standard cylindrical die (2.09 millimeter diameter, 8 millimeter length). The MFI is defined as the weight of flow in grams per 10 minutes. The referred norms are ISO R 1138 or ASTM D 1238. In case of iPP, the working conditions were a load of 2.16 kilograms and a temperature of 230 degrees Celsius.

The microhardness of the prepared material was measured at room temperature using a Leitz tester equipped with a square-based diamond indenter [8]. The H-value was derived from the residual projected area of indentation according to: $H=kP/d^2$. In this expression, d is the length of the impression diagonal in meters, P is the contact load applied in N, and k is a geometrical factor equal to 1.854. loads of 0.25, 0.5, 1 and 2 N were used. The loading cycle was 0.1 minute, 8 to 10 indentations were made on each sample, and the results were averaged.

Thermal analysis was performed in a Perkin-Elmer differential scanning calorimeter DSC-7, in a $N_2$ atmosphere. The temperature range studied was between about 40 degrees Celsius to about 220 degrees Celsius. The heating rate was about 10 degrees Celsius per minutes or 20 degrees Celsius per minute. Typical sample weights were between about 5 milligrams to about 10 milligrams. The crystallinity measured by calorimetry, $\square_{DSC}$, was derived from the melting enthalpy obtained by DSC using the following expression: $\square_{DSC}=\Delta H_m/\Delta H_m^\infty$, where $\Delta H_m$ and $\Delta H_m^\infty$ are the experimental melting enthalpy, and the melting enthalpy for an infinitely long crystal, respectively.

A WAXS study was performed on the sample using a Seifert diffractometer (reflection mode). The working conditions were: voltage: 40 kV; intensity: 35 mA; angular range: 5° to 30° (2$\square\square$) scan rate: 0.01°/s; slits: 0.3, 0.2. The crystallinity $\square_{rX}$ of the prepared material and control samples was calculated as the relation of the area corresponding to the crystalline peaks to the total area of the diffractogram.

Figure 2:
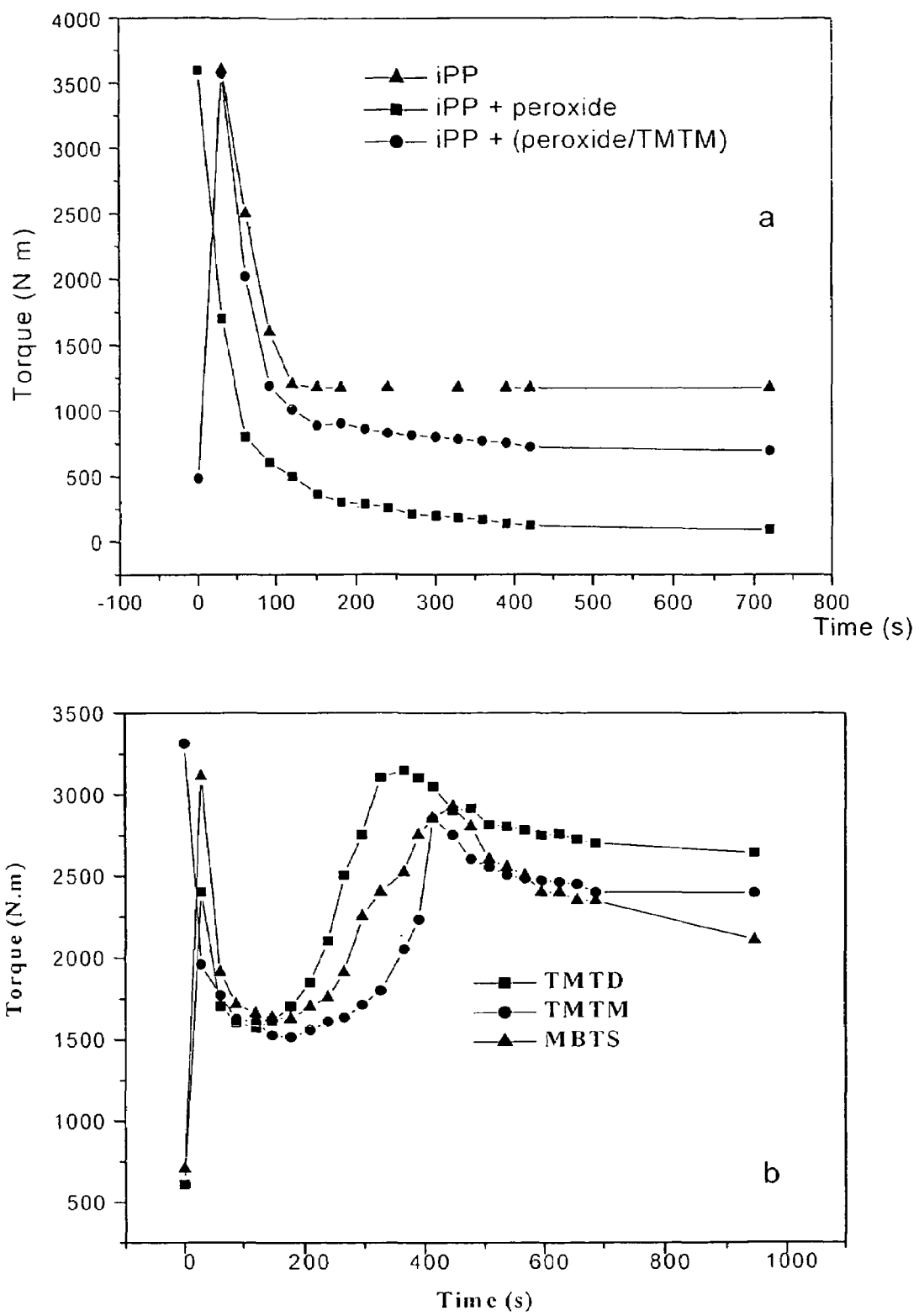
FIG. 2 depicts the effect of the peroxide and the couple peroxide/accelerator tetramethyl thiuram monosulphide (TMTM) on the torque-time evolution of iPP and the effect of the accelerator type on the torque-time evolution of iPP in presence of different cross-linking agents (peroxide/sulfur/accelerator).

A torque-time rheometer was used to study the unmodified iPP sample, as well as the samples with the peroxide and the couple peroxide/accelerator. Experimental results of torque-time evolution are shown in FIG. 2. The torque of iPP in presence of peroxide is lower than that of pure iPP. It is believed that this is due to the peroxide radicals, particularly at the tertiary carbons of iPP, being more reactive sites, forming macro-radicals by disproportionation or by cyclisation of the end groups. It is believed that the peroxide provokes the scission of the iPP chains. However, the torque of the iPP with the coupling peroxide/accelerator is lower than that of pure iPP, but higher than the corresponding to the iPP plus peroxide. It is believed that a controlled scission takes place, because the accelerator decreases the peroxide efficiency. It is anticipated that the accelerator could then be inhibiting or slowing down the action of the peroxide.

The decrease of the torque in the presence of peroxide is believed to occur because there is a decrease of the molecular weight ($M_w$) of the mixture. As peroxide concentration increases a lower $M_w$ is obtained. The $M_w$ of the resulting material is believed to be controlled by the accelerator concentration related to, both, the concentration and the activity of the peroxide.

In this invention, it is contemplated that the weight fraction of the accelerator should not exceed that of the peroxide. It is thought that because the accelerator has an activation effect on the sulfur, the combination of the sulfur, the peroxide and the accelerator gives rise to the cross-linking reaction.

FIG. 2 additionally shows the effect of the different accelerators used when the three components (peroxide/sulfur/accelerator) are added to the polymer. It is to be noted that the $T_B$ values ($T_B$=maximum torque, corresponding to the maximum cross-linking degree) are not so different for the three accelerators used. The maximum degree of cross-linking (maximum $T_B$) takes place at a shorter time for TMTD, and at a longer time for MBTS. The most interesting aspect here is that the macro-radicals of the iPP chains present a very long lifetime.

Data concerning the impact strength and the microhardness of samples are collected in Table 2 for the formulations of Table 1.

TABLE 2

Microhardness and impact strength of isotactic polypropylene normal, and cross-linked by using different agents:

| Sample | H (MPa) | Impact strength (J/m²) |
|---|---|---|
| iPP | 89 | 4.47 |
| 1 | 78 | 19.40 |
| 2 | 72 | 15.91 |
| 3 | 79 | 24.47 |
| 4 | 70 | 18.25 |
| 5 | 88 | 30.94 |
| 6 | 81 | 19.79 |

All samples show hardness values slightly lower than that of initial isotactic polypropylene (iPP), except Sample 5. The hardness of this sample is almost identical to that of iPP (see Table 2, column 2). None of the samples included in this study showed any elastic recovery.

Figure 3:
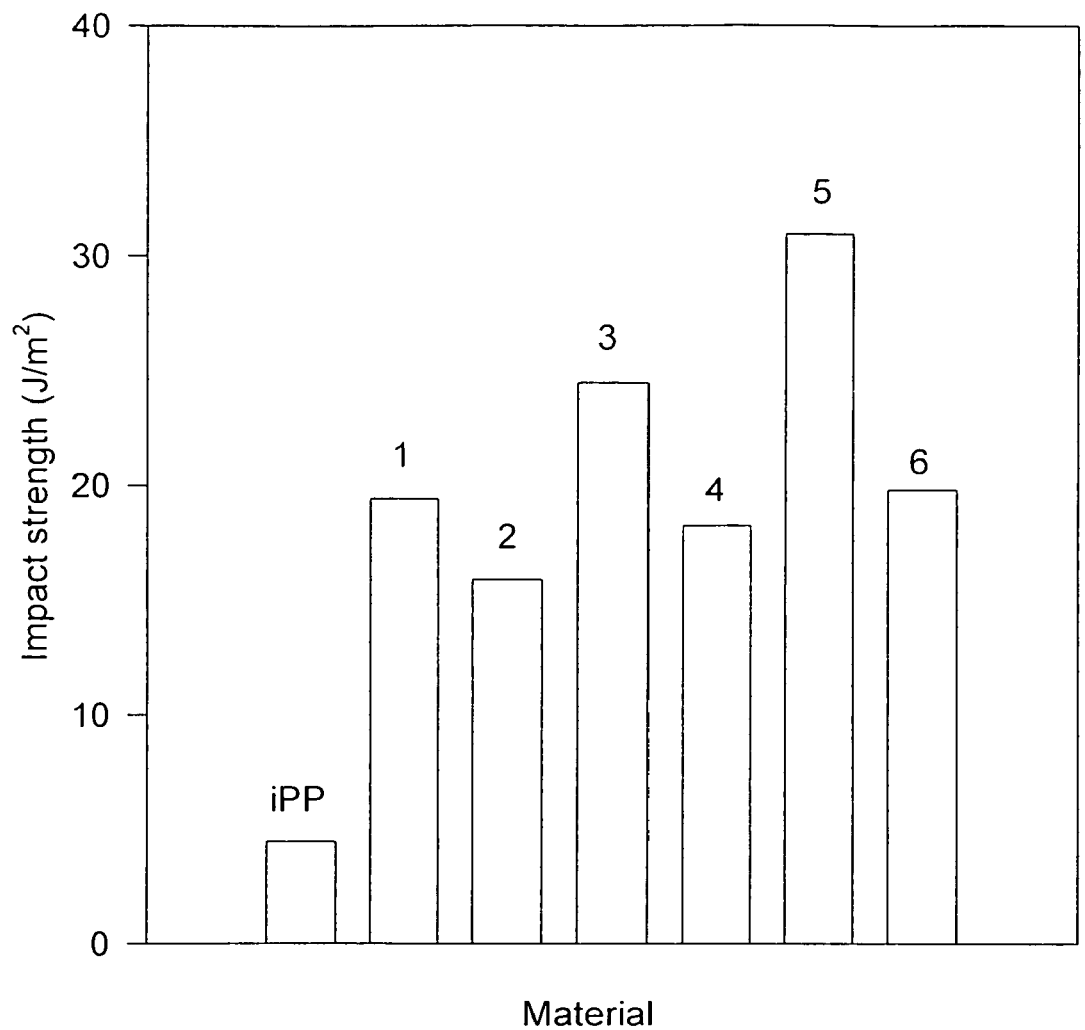
FIG. 3 depicts the impact strength shown by the unmodified iPP and by the cross-linked samples using the sample compositions of Table 1 of the detailed description.

FIG. 3 shows the influence of the cross-linked structure on the impact strength for notched specimens at room temperature. The effect of the different cross-linking agents and of the different weight fractions on $a_k$ is apparent.

Figure 4:
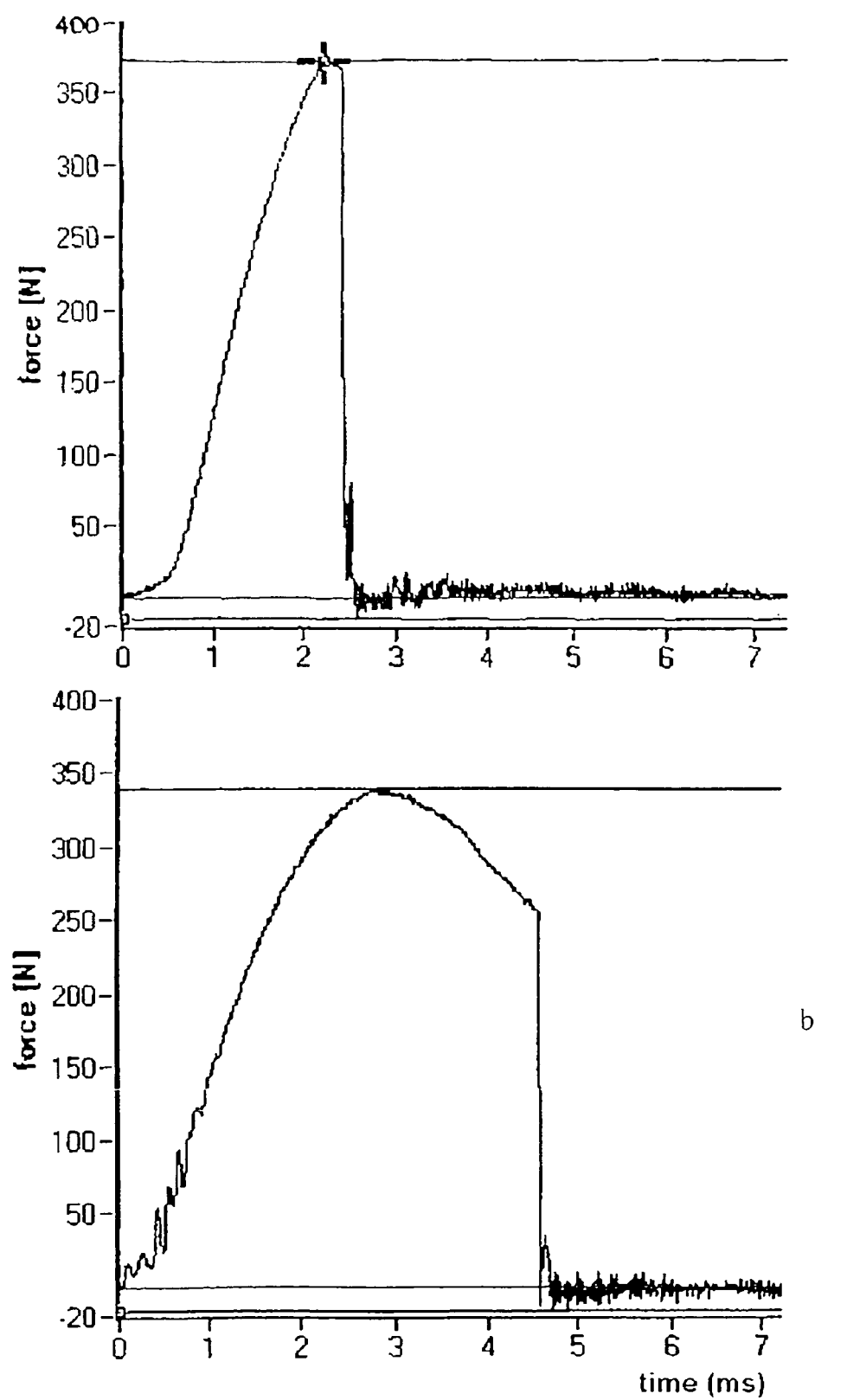
FIG. 4 depicts a plot showing the fracture behavior of an unmodified iPP and sample number 5 from Table 1 of the detailed description.

The histogram clearly shows that the modified material reaches higher impact strength values than those of the raw material. In particular, the impact strength for Sample 5 (iPP with a 0.05% of MBTS added) is as high as 30.94 J/m², i.e., about 7 times the value of unmodified iPP (4.47 J/m², see table 2, column 3). Also, it is noteworthy the fact that, whereas the iPP raw material presents brittle fracture behavior, for the different cross-linked iPP samples ductile fracture behavior is observed. Compare FIG. 4 (unmodified iPP), and (iPP with a 0.05% of MBTS added). The other cross-linked samples behave similarly.

TABLE 3

Melting points $T_{m1}$ and $Tm_2$ from DSC; crystal thickness values $l_{c1}$ and $l_{c2}$ derived from the melting points; melting enthalpies $\Delta H_1$, $\Delta H_2$ and $\Delta H_m$ total and crystallinity values $\alpha_{DSC}$ and $\alpha_{rX}$ derived from the DSC and WAXS. (For the samples of Table 1).

| Sample | $T_{m1}$ (° C.) | $l_{c1}$ (nm) | $\Delta H_1$ (J/g) | $T_{m2}$ (° C.) | $l_{c2}$ (nm) | $\Delta H_2$ (J/g) | $\Delta H_m$ total (J/g) | $\alpha_{DSC}$ (total) | $\alpha_{rX}$ |
|---|---|---|---|---|---|---|---|---|---|
| iPP | — | — | — | 163.2 | 19.2 | 114.1 | 114.1 | 0.55 | 0.48 |
| 1 | 118.4 | 9.6 | 30.3 | 158.5 | 16.1 | 82.3 | 112.7 | 0.50 | 0.39 |
| 2 | 117.7 | 9.3 | 31.2 | 157.8 | 15.7 | 81.6 | 112.8 | 0.50 | 0.41 |
| 3 | 118.6 | 9.7 | 33.7 | 159.9 | 16.9 | 83.3 | 117.0 | 0.52 | 0.42 |
| 4 | 117.6 | 9.3 | 25.2 | 158.6 | 16.4 | 75.4 | 100.5 | 0.45 | 0.40 |
| 5 | 117.7 | 9.3 | 30.1 | 160.8 | 17.5 | 96.5 | 126.5 | 0.57 | 0.42 |
| 6 | 118.4 | 9.6 | 30.2 | 158.8 | 16.3 | 84.3 | 114.5 | 0.51 | 0.42 |

From the calorimetric study, it is seen that the cross-linking process gives rise to a new, low temperature peak, not appearing in the non-modified iPP.

Figure 5:
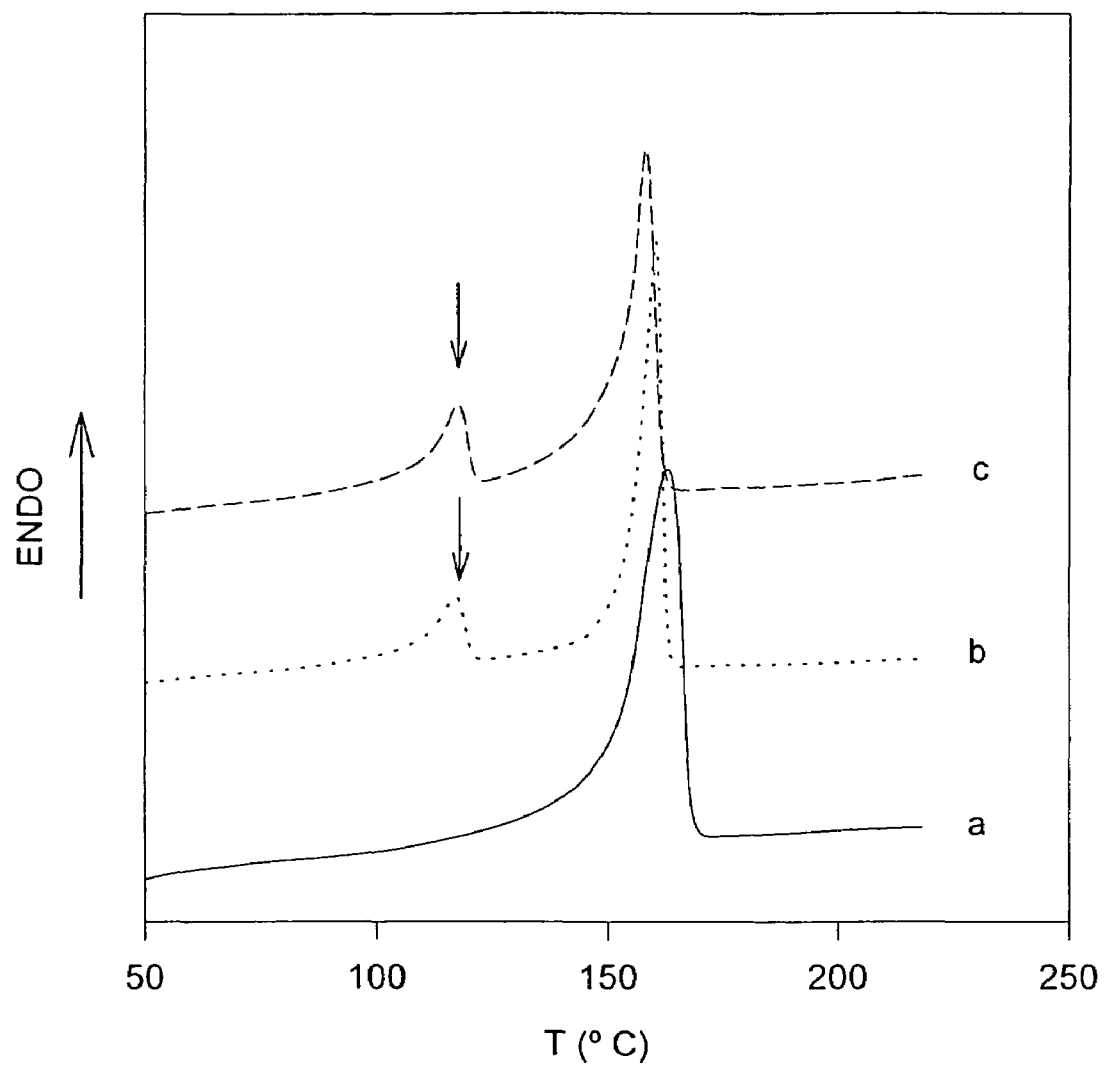
FIG. 5 depicts a thermogram and an unmodified iPP, sample number 5 from Table 1 of the detailed description and from sample number 6 of the same Table 1.

Compare FIG. 5, (the thermogram of the non-modified iPP), with the thermograms obtained on Samples 5 and Sample 6, i.e., cross-linked iPP prepared with 0.05% and 0.1% of MBTS. The new peak, indicated by an arrow, is probably caused by the presence of polyethylene (PE) chains, eventually originated by the action of the peroxide and potassium persulfate on some of the tertiary carbon atoms of the iPP.

Table 3 includes the melting temperatures $T_m$ corresponding to the different peaks of every sample. The thermodynamic crystal size 1c has been calculated for each maximum from the Thomson-Gibbs equation:

$$Tm = Tm0[1-(2\sigma e/\Delta Hm\infty 1c)] \quad (1)$$

where $\sigma e$ is the surface free energy and $Tm0$ is the equilibrium melting point of each component. The 1c values, the melting enthalpies $\Delta Hm$, and the crystallinities $\alpha DSC$ for, both, PP and PE are also included in Table 3. In this calculation, the following values were used: for the iPP, $\Delta Hm\infty=207.33$ J/g [14], $Tm0=460.70$ K [14] and $\sigma e=100$ erg/cm2 [15]; for the PE, $\Delta Hm\infty=293.86$ J/g [14] and $Tm0=414.6°$ K [14]. For the surface free energy of the PE, $\sigma e=79$ erg/cm2[16]. However, this $\sigma e$ value is probably an upper limit. The energy values shown in the thermograms of the cross-inked samples is 117 degrees Celsius to 118 degrees Celsius. This is a relatively low value, suggesting that the PE originated during the cross-linking process has a low molecular weight and/or is not linear, but branched.

Figure 6:
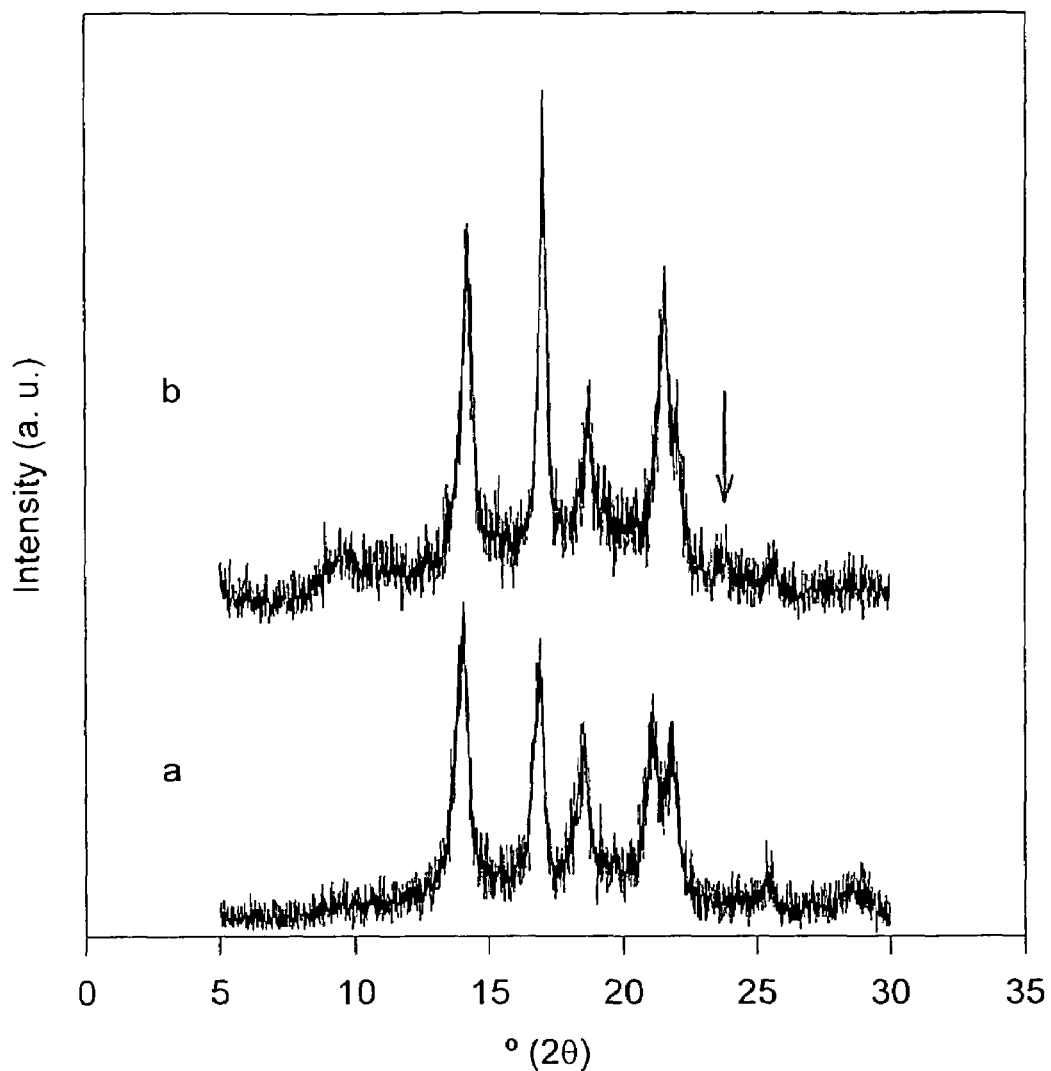
FIG. 6 depicts a WAXS diagram of an unmodified iPP, with sample number 6 from Table 1 of the detailed description.

WAXS patterns taken for the non-modified and cross-linked samples show the characteristic reflections of the monoclinic α-form of isotactic polypropylene is shown in FIG. 6. By comparing the diffractogram of the original iPP with that of the cross-linked Sample 6, prepared with a 0.1% of MBTS, it is seen that the reticulation process affects mainly the relative intensity of the first and second diffraction peaks. The other cross-linked iPP samples behave similarly.

All cross-linked samples exhibit crystalliny values $\alpha_{rX}$ slightly lower than that of the unmodified iPP. Table 3 includes $\alpha_{rX}$ data for all the samples (column 10).

From a closer inspection of the WAXS patterns of the cross-linked material, one observes one new, small intensity reflection appearing at 23.85° (2θ). A cross-linked sample with a 0.1% of MBTS, is indicated by an arrow. This new reflection, not appearing in the original iPP of FIG. 6, could be associated to the (200) planes in polyethylene (PE). In addition, the (111) reflection of the original iPP, at 21.030 (2θ), in the cross-linked material is slightly shifted towards higher angles, and nearly coincides with the peak (110) of PE, at 21.55° (2θ).

It is noticed that a band at 720 cm$^{-1}$ is attributed to the ethylenic chains induced during the cross-linking process. This band, usually appearing in the range 750-720 cm$^{-1}$, is characteristic of the "rocking" mode of the —CH$_2$)$_n$— sequences when n≧4 [19]. In addition, at 650 cm$^{-1}$ a new band appears. This band could be due to the "stretching" mode of the —C—S— groups, thus being directly related to the bridging chains created in the cross-linked material.

From the results shown in FIG. 2, it can be seen that the equilibrium torque value $T_C$, and also the difference between the maximum torque $T_B$ and the equilibrium torque $T_C$ values, are different for each accelerator type.

In the torque-time curves the activation energy of the cross-linking has always been calculated between $T_B$ and $T_A$. However, a decrease from $T_B$ to $T_C$ is observed. This result is believed to be due to the long macro-radicals' lifetime. The fast initial cross-linking reaction should result in a high degree of cross-linking, which later undergoes a partial destruction by the high shearing developed just before the equilibrium takes place. The cross-linking degree is determined at the equilibrium torque value $T_C$ because at this stage there is a stable equilibrium for very long processing times. This is should be due to the fact that a stable torque value involves a stable viscosity. Consequently, a stable cross-linking degree occurs during a longer time (~15 minutes) that corresponds to 5 times the extruder cycle time. Accordingly, a reversible cross-linking reaction will not affect the overall cross-linking degree, even for a multi-repeated processing cycle.

The data indicates that the cross-linking process originates a slight decrease in the crystallinity and microhardness of the samples. Furthermore, from the DSC and WAXS results, it is clear that cross-linking gives rise to the appearance of a certain amount of PE (25%-29%). The generation of the ethylenic chains is believed based on the presence of oxy-radicals of the peroxide attacking the tertiary carbons of the iPP. Alcoholates are provided by the peroxide or the peroxidisulfate and stabilize these tertiary carbons through formation of double bonds, which may react with the hydrogen H atom of the methyl side groups.

The cross-linking process is thought to be responsible for the improvement of the impact strength in the modified samples. The six formulations based on the different accelerators with the two compositions (0.2% and 0.4% by weight) related to the matrix, show a synergistic effect on $a_k$.

According to the foregoing, the structure of the modified iPP could be considered as a combination of rubber-like and crystalline thermoplastic components. The above results also indicate that cross-linking takes place at a higher scale than crystallite formation. This assumption fits well with the results obtained. Thus, the more bridges are formed (higher cross-linking degree), the higher is the ductile behavior (the rubber like behavior). This transformation from a brittle to a ductile behavior in the modified material is extremely important. As pointed out in the introduction, the bridges present in the modified iPP, basically originated by the sulfur component, act as linking agents of the olefin macrochains involved.

The influence of the accelerator type on the reactive blend to form a network has a direct effect on the impact fracture. The mode of dispersion of the different components and the network architectural structure are factors that can be properly adjusted to obtain blends with lower values of residual stress. The brittle-ductile fracture transition of iPP is usually promoted either by blending the iPP with EPDM or EPR, or with a 6%-7% of LDPE when a peroxide is added. Within this context, the high impact strength iPP does not need to be blended to become a ductile material.

There is a great flexibility in the formulation of the cross-linking agents, so that many combinations are possible.

Another advantage of the new cross-linking method described above is the possibility of recycling the cross-linked samples a number of times. The samples can be repeatedly molten and used again, which is an important aspect when one compares these products with conventional elastomers.

The reversibly cross-linked iPP is an innovative material from a mechanical point of view. In addition, the reactivity of cross-linked iPP overcomes the problem of recycling. This is another aspect that will probably improve the wide using range of this material.

The cross-linking agent forms from the blend of the peroxide, the sulfur and the accelerator. The cross-linking agent can vary depending on the radical peroxide efficiency and the activation rate.

While these embodiments have been described with emphasis on the preferred embodiments, it should be understood that within the scope of the appended claims, the embodiments might be practiced other than as specifically described herein.

What is claimed is:

1. A method for preparing reversibly cross-linked isotactic polypropylene having a degree of crystallinity substantially identical to a degree of crystallinity of a starting polypropylene comprising:
   A. mixing in the presence of heat;
      (1) a polymer selected from the group consisting of:
         (a) isotactic polypropylene homopolymer;
         (b) isotactic polypropylene copolymer; and
         (c) mixtures of isotactic polypropylene homopolymer and copolymer;
      (2) an elastomer;
      (3) an organic peroxide; and
      (4) an accelerator, forming macro-radicals;
   B. simultaneously coupling the macro-radicals with a sulfur obtaining an optimum cross-linking degree, wherein the accelerator is present in a concentration ranging from a 1:4 mass ratio with the sulfur to a 1:1 mass ratio with the sulfur, and wherein the weight fraction of the accelerator does not exceed the weight fraction of the organic peroxide.

2. The method of claim 1, wherein the mixing in the presence of heat is in using one or more of the processes consisting of: extrusion, blow molding, compression molding or another thermoplastic transformation mixing process.

3. The method of claim 1, wherein the accelerator is tetramethyl thiuram monosulfide (TMTM) or tetramethyl thiuram disulfide (TMTD), Dibenzothiazole Disulfide (MBTS), or mixtures thereof.

4. The method of claim 1, wherein the organic peroxide is a dicumyl peroxide (DCP).

5. The method of claim 1, wherein the sulfur is selected from the group consisting of a sulfur atom $S_1$, a polysulfide $S_x$, a sulfur cyclic compound.

6. The method of claim 1, wherein the sulfur is potassium persulfate.

7. The method of claim 1, wherein the organic peroxide has a decomposition temperature greater than 100 degrees Celsius.

8. The method of claim 1, wherein the accelerator has an activation temperature greater than 140 degrees Celsius.

9. The method of claim 1, wherein the elastomer is a urethane rubber.

10. A reversibly cross-linked isotactic polypropylene made by the method of claim 1, wherein the polypropylene polymer has an impact strength of 15.91-30.94 $J/m^2$; a microhardness of 70-88 MPa; a crystallinity value $\alpha_{DSC}$ derived from DSC of 0.45-0.57; and a crystallinity value $\alpha_{rX}$ derived from WAXS of 0.39-0.42.

\* \* \* \* \*